United States Patent [19]

Petrowski et al.

[11] 4,045,589
[45] Aug. 30, 1977

[54] FAT EMULSION PRODUCT AND PROCESS FOR PRODUCING THE SAME

[75] Inventors: Gary E. Petrowski, Santa Monica; John M. Wolcott, Burbank; Erlinda P. Ortiz, Ontario, all of Calif.

[73] Assignee: Carnation Company, Los Angeles, Calif.

[21] Appl. No.: 697,837

[22] Filed: June 21, 1976

[51] Int. Cl.$^2$ .............................................. A23C 11/00
[52] U.S. Cl. ................................... 426/609; 426/98; 426/658; 426/661
[58] Field of Search ................ 426/96, 98, 601, 609, 426/658, 661

[56] References Cited

U.S. PATENT DOCUMENTS

| | | | |
|---|---|---|---|
| 2,876,160 | 3/1959 | Schock et al. | 426/609 X |
| 2,913,342 | 11/1959 | Cameron et al. | 426/609 X |
| 3,592,940 | 7/1971 | Quesada | 426/609 X |
| 3,706,572 | 12/1972 | Einstman et al. | 426/98 X |
| 3,792,178 | 2/1974 | Nozuick et al. | 426/98 X |

*Primary Examiner*—Joseph M. Golian
*Attorney, Agent, or Firm*—Eugene C. Ziehm; Robert D. Kummel

[57] ABSTRACT

A stable, dry, non-dairy fat emulsion product suitable for use as a coffee whitener is prepared without the use of protein by incorporating a chemically modified dextrinized starch having a lipophilic character in the formulation. The chemically modified starch is included in an aqueous emulsion containing fat or oil and a conventional emulsifier to stabilize the emulsion through the drying step so that upon reconstitution in coffee a stable emulsion is formed. The pH of the liquid emulsion must be controlled in order for the chemically modified starch to be effective in stabilizing the emulsion through the drying step. A buffering agent is mixed with the dried emulsion to improve the taste of coffee whitened with the dried emulsion.

18 Claims, No Drawings

FAT EMULSION PRODUCT AND PROCESS FOR PRODUCING THE SAME

BACKGROUND OF THE INVENTION

1. Field of the Invention

This invention relates to a dried non-dairy fat emulsion product suitable for use as a coffee whitener and to the method of producing the product. More particularly, the invention relates to a protein-free dried fat emulsion product, which, when reconstituted with an aqueous media, such as coffee, provides a stable oil-in-water emulsion food product.

2. Description of the Prior Art

In recent years, dried, non-dairy coffee whiteners have become of increasing importance in the food industry because of their ability to whiten coffee and their economy, taste, ease of handling and excellent shelf-life. Such dry, non-dairy coffee whiteners are prepared as an emulsion concentrate which is spray dried and, on addition to an aqueous media such as coffee or tea, form a reconstituted oil-in-water emulsion which whitens and flavors the beverage. Generally, such powdered whiteners comprise, on a dry weight basis, 25%-50% vegetable fat, 35%-65% carbohydrate (such as corn syrup solids, sucrose, etc.), 3%-12% protein, 1%-5% emulsifiers, 0.55-3% stabilizer and stabilizing salts, plus minor amounts of coloring and flavoring agents and anti-caking agents.

In such dry coffee whitener formulations, the vegetable fat or oil, which has a particle size of about 1-3 microns in diameter, provides whitening power, body and viscosity. The whitening effect is produced in coffee or tea primarily as a result of light reflected from the surface of finely emulsified fat globules. The carbohydrate acts as a carrier for the fat to retard coalescense of the fat and provides some sweetness effect. Emulsifiers, such as mono-and diglycerides, diacetyl tartaric acid esters of mono-and diglycerides, propylene glycol-monostearate, lecithin, and the like are incorporated to maintain the fat globules in dispersion. However, it has been found that while such conventional emulsifiers are effective in stablizing the liquid emulsion concentrate prior to the drying step, they are ineffective following drying procedures. Thus, in the production of a coffee whitener, a stable liquid emulsion concentrate containing fat or oil, water and conventional emulsifier can not be dried and reconstituted in coffee to form the same stable emulsion, for upon reconstitution a breakdown of the emulsion occurs as evidenced by separation of the fat and coalescense of the fat globules, with little or no whitening of the coffee.

This problem has been overcome heretofore by including in the liquid emulsion concentrate, a water dispersible protein, such as sodium caseinate or soy protein. The inclusion of protein in the liquid emulsion concentrate has been found to be necessary to stabilize the emulsion through the drying step, so that when the dried product is reconstituted in coffee, a stable emulsion is provided.

While this use of protein in the formulation has enabled dried coffee whiteners to be prepared having excellent stability and whitening, it is disadvantageous in some respects. In formulations which contain protein, it is also common to include in the products, stabilizers, such as carrageenin, alginates, guar gum, etc., and/or stabilizing salts, such as sodium citrate, tetrasodium pyrophosphate, etc. to improve the colloidal dispersibility of the protein. The inclusion of these materials, of course, increases the cost of the dried product. Moreover, while sodium caseinate is legally defined to be a non-dairy material, its inclusion in the emulsion makes the product unacceptable to some ethnic groups. The use of other water dispersible proteins, such as soy protein, has been less than satisfactory due to off-flavors, feathering of the protein in coffee and other problems. While the prior art has proposed a number of solutions in order to reduce or eliminate protein from dried coffee whiteners, none of these prior suggestions has been completely satisfactory.

SUMMARY OF THE INVENTION

It has now been discovered that a dried fat emulsion product having excellent stability and coffee whitening characteristics can be prepared without the use of protein by incorporating in the formulation a chemically modified dextrinized starch having a lipophilic character. Such chemically modified starches have been found to be effective in maintaining a stable emulsion subsequent to drying of the liquid emulsion concentrate so that protein may be eliminated from the formulation. Thus, a liquid emulsion concentrate containing water, vegetable fat or oil, carbohydrate, emulsifier and the chemically modified dextrinized starch having a lipophilic character is prepared and dried to provide a product which, upon reconstitution by addition to an aqueous media such as coffee or tea, disperses easily in hot liquids with no sign of fat "oiling off" or emulsion instability and which has a whitening effect in coffee equal or superior to conventional whiteners. The pH of this liquid emulsion concentrate must be maintained at about 4.0 or below prior to drying, in order for the chemically modified starch to effectively stabilize the emulsion through the drying step. One or more buffering salts are added to the dried emulsion concentrate to improve the flavor of the product as a coffee whitener.

DESCRIPTION OF THE PREFERRED EMBODIMENTS

More specifically, the product of the present invention is a dry, stable, protein free fat emulsion product, which is provided by forming a liquid emulsion concentrate having a controlled pH and containing a fat or oil, an emulsifier and a chemically modified dextrinized starch having a lipophilic character, and drying the liquid emulsion concentrate. A wide variety of edible fats or oils may be used in the present invention. The fat or oil may be of animal or vegetable source, but should have a bland or neutral flavor and long term stability towards oxidation and the development of rancidity. Moreover, in formulating dried coffee whiteners it is generally preferred to use fats with a melting point of about 110° F.-115° F. so that a major portion of its triglycerides will remain in a solid state at the maximum temperatures usually encountered in handling, shipping and storage of the product. Fats and oils which may be used include partially or fully hydrogenated vegetable fats and oils such as, for example, cottonseed oil, coconut oil, corn oil, soybean oil, peanut oil, sunflower oil, palm kernel oil, and the like, and mixtures thereof, tallow and lard.

The amount of fat or oil in the dried product may vary from about 20% to 50% by weight, with levels of between about 25% to 50% by weight of the dried product being preferred.

An emulsifier is included in the liquid emulsion concentrate to increase the ease of formation of the emulsion and to promote the stability of the liquid emulsion concentrate to be dried. Emulsifiers which may be used are those which are approved for use in foods, such as mono- and diglycerides, glycerol monostearates, sorbitan esters of hexitol anhydrides, polyoxyethylene sorbitan esters of hexitol anhydrides, and combinations of such food approved emulsifiers. The amount of emulsifier used should be within the range of about 0.2%–1.25% by weight of the solids used in the emulsion concentrate. Amounts greater than about 1.25% have been found to decrease the ability of the dried product to whiten coffee and adversely affect the flavor of the product.

As noted hereinabove, protein has been considered heretofor to be an essential ingredient in dried coffee whiteners. It has now been discovered that a stable dry coffee whitener having excellent whitening characteristics when reconstituted in coffee can be prepared without the use of protein by incorporating a chemically modified dextrinized starch having a lipophilic character in the liquid emulsion concentrate. The inclusion of such a starch derivative in the emulsion concentrate stabilizes the emulsion through the drying step so that when the dried product is reconstituted in coffee a stable emulsion is formed which has a whitening effect equal or superior to conventional protein-containing whiteners.

Such chemically modified starches are dextrins derived from ungelatinized starch acid-esters of substituted dicarboxylic acids. Such ungelatinized starch acid-esters are prepared by reacting an ungelatinized starch, in an alkaline medium, with a substituted cyclic dicarboxylic acid anhydride, such as substituted succinic and glutaric acid anhydrides, as disclosed in U.S. Pat. No's 2,661,349, 3,455,838, and the patents referred to therein. The starch acid esters are coverted into dextrins by any of the well known dextrinization procedures, such as treatment with heat and/or acid. Generally, it is preferred to use as the starch derivative, dextrinized waxy maize starch chemically modified with octenyl succinic anhydride. However, it will be understood that other starches, such as waxy sorghum, sago, tapioca, potato, corn, sorghum, rice and wheat, and other substituted cyclic dicarboxylic acid anhydrides, such as decenyl succinic acid anhydride, nonenyl succinic acid anhydride, heptyl glutaric acid anhydride, and the like may be used in preparing the starch derivatives. Chemically modified dextrinized starches having a lipophilic character which may be used in the present invention have a pH of about 2.5 to 3.0 and are available commercially from a number of manufactures, such as, for example, CAPSUL starch supplied by National Starch and Chemical Corporation, SECAP 7400 starch supplied by Anheuser-Busch, Inc., and AMIOGUM starch supplied by American Maize Co.

In order to prepare a stable dried emulsion, the amount of starch derivative in the liquid emulsion concentrate should be sufficient to provide the dried emulsion with a starch derivative to fat ratio of between about 0.4–1.2 to 1, with a ratio of between 0.6–0.8 to 1 being preferred. Greater amounts, that is a ratio of starch derivative to fat of up to about 1.25:1 may be used without adversely affecting the stability of the dried emulsion but are generally not desired, because they adversely affect the flavor of the dried whitener and are uneconomical.

The pH of the fat-emulsifier containing liquid emulsion concentrate must be maintained at a value of no more than about 4.0 prior to the drying step in order for the chemically modified starch to stabilize the liquid emulsion concentrate through drying. It has been found that the stability of the dried emulsion upon reconstitution, is poor if the pH of the emulsion concentrate is above about 4.0 prior to drying.

The dried fat emulsion product may also contain a water soluble carbohydrate such as corn syrup solids, sucrose, lactose, and the like to provide flavor, improve product body and to act as a carrier for the fat. Generally the dried emulsion of this invention contains about 10% to 35% by weight of the carbohydrate. While greater amounts, up to about 55% by weight of the product may be used, there is no advantage to doing so. However, it is to be understood that the carbohydrate is not an essential ingredient of the dried emulsion and may be entirely eliminated from the product without affecting the stability of the product.

A dried fat emulsion product, to be suitable fo use as a coffee whitener should, upon addition to coffee, not only whiten the coffee but also reduce somewhat the acidity of the coffee, which has a pH of about 4.0–4.2, preferably raising the pH of the coffee to between about 4.5 and 5.0, so that some of the coffee bitterness can be removed. A dried fat emulsion product containing only fat, emulsifier, carbohydrate, and chemically modified starch derivative, if not neutralized, can not reduce the acidity of the coffee, since such a dried product generally has a pH of below about 4.0, due to the acidity of the starch acid-ester. However, as noted hereinabove, it is necessary that the pH of the liquid emulsion concentrate be maintained below about 4.0 prior to drying to ensure the effectiveness of the chemically modified starch derivative in stabilizing the emulsion through the drying step. In order to obtain a dried whitener which provides a stable emulsion upon reconstitution in coffee while at the same time is capable of reducing the acidity of the coffee, one or more buffering salts are mixed with the dried emulsion product. The buffering salt is dry blended with the dried emulsion in an amount sufficient to provide a product having a pH of between about 6–7 when reconstituted in water. Such a product when added to coffee reduces the acidity of the coffee as seen by an increase in the pH of the coffee to between about 4.5 and 5.0, thereby improving the taste of the coffee. Generally it is preferred to use mono- and dipotassium phosphate and mixtures thereof as the buffering salt to be admixed with the dried fat emulsion product. However other phosphate and citrate salts, such as sodium citrate, tetrasodium pyrophosphate, disodium salts of phosphoric acid, and other food approved buffering salts capable of raising the pH of the dried emulsion may be used. According to a preferred embodiment, mono- and dipotassium phosphate salts are admixed to provide a buffer having a pH of about 6–8, and this buffer combination is dry blended with the dried emulsion concentrate in amounts of from 1% to 3%, preferable 2.0% to 2.5%, by weight of the dried emulsion.

In addition, an anticaking agent, such as sodium silico aluminate, may be added to the dried concentrate to improve the flowability of the dried emulsion. Small amounts of coloring and/or flavoring agents may also be included in the formulation.

In preparing the product of this invention, a liquid emulsion concentrate is formed prior to the drying step by dissolving and/or dispersing the various dry ingredients in enough water to maintain the solids in solution or dispersion and provide sufficient fluidity to the concentrate so that it may be pumped. The dissolved and dispersed solids of the liquid emulsion concentrate are usually in the range of 50%-70%. Generally, in preparing the emulsion concentrate, the fat is heated to about 130° F.-140° F. and the emulsifier is added to the liquified fat. The chemically modified starch derivative and the carbohydrate (if used) are added, with agitation, to water having a temperature of about 150° F.-200° F. to disperse or dissolve them, the resulting solution having a pH of about 3.0 or below. The water phase and fat phase are then mixed and homogenized to provide a stable emulsion in which the fat particles average about 1-3 microns in diameter. This liquid emulsion concentrate is then dried to a moisture content not in excess of about 3%, the dried emulsion having a pH of between about 3.5-4.0. While the liquid emulsion concentrate preferably is spray dried, other drying procedures may also be used, such as freeze drying, drying on heated drums, etc. Dry buffering salts are dry blended with the dried emulsion to provide a stable dried emulsion having a pH of between 6.0-7.0 when reconstituted in water.

The resulting product, when added to coffee, whitens and flavors the coffee with no sign of fat "oiling off" or emulsion instability. de The following examples are given to further illustrate, not to limit, the invention. In the instant specification, appended claims and the following specific examples, all parts and percentages are by weight unless otherwise indicated.

EXAMPLE I

A dry, protein-free, non-dairy coffee whitener of the present invention was prepared in the following manner. A liquid emulsion concentrate having a total solids content of 65.0% was prepared by the following steps. First, 30 gms. of soybean oil was heated to 130°-140° F. and 0.33 gms. of an emulsifier mixture of sorbitan monostearate and polyoxyethylene sorbitan monostearate was added to the heated oil phase. Secondly, 12.5 gms. of corn syrup solids was admixed with 37.5 gms. of a chemically modified dextrinized starch having a lipophilic character sold under the trademark CAPSUL starch by National Starch and Chemical Corporation. CAPSUL starch is a dextrinized waxy maize acid-ester of a substituted succinic acid, derived from octenyl succinic acid anhydride, whose aqueous solution exhibits a pH of about 3. The starch derivative-carbohydrate mixture was added to 43.3 gms. of water at approximately 190° F. to provide a water phase. Finally, the oil and water phases were mixed and stirred for about ten minutes and homogenized at 3000-4000 p.s.i. to provide a liquid emulsion concentrate. This liquid emulsion concentrate was then freeze dried to provide a dried product having a pH of about 3.5-4.0 and a ratio of starch derivative to fat of about 1.25:1. This dried emulsion concentrate is referred to hereinbelow as Product A.

Three additional dried emulsion concentrates were prepared according to the same procedure given above with the exception that in one emulsion concentrate, 37.5 gms of gum arabic was used in place of the chemically modified starch derivative, Product B; in another, 37.5 gms of a non-chemically modified starch (sold under the trademark MORNING STAR starch) was used in place of the chemically modified starch derivative, Product C; and in the third, the emulsion concentrate contained only soybean oil, emulsifier, corn syrup solids and water, Product D.

Reflectance measurements were obtained at 550 nm on each of the dried emulsion cocentrates as a 2% cold aqueous solution in deionized water and at 2.3% solids in a 1% solution of freeze-dried coffee at 170°-190° F. to determine the stability of the dried concentrate. In order to provide a basis for comparison, similar measurements were obtained on similar solutions using a commercial coffee whitener, COFFEE-MATE sold by Carnation Company. The values obtained are set forth in Table 1.

Table 1

| Product Tested | % Reflectance | |
|---|---|---|
| | 2% aqueous solution | 2.3% solution in coffee |
| A | 48 | 14.2 |
| B | 3.8 | 2.4 |
| C | 10.2 | 3.1 |
| D | 3.5 | 0 |
| COFFEE-MATE | 50.9 | 16.7 |

Thus, Product A, the protein-free dried emulsion concentrate containing the chemically modified starch derivative of the present invention compared favorably in whitening effect to the commercial coffee whitener, and showed no signs of fat oiling off or emulsion instability when added to coffee. However, the taste of the coffee whitened with product A was undesirably bitter due to the acidity of the dried emulsion. Products B, C and D did not form a stable emulsion when reconstituted, as evidenced by the low reflectance values obtained.

EXAMPLE II

A stable spray dried, protein-free, non-dairy coffee whitener was prepared from a liquid emulsion concentrate containing the following ingredients:

| Ingredient | Percent by Weight |
|---|---|
| Hydrogenated Coconut Oil (m.p. 110° F.) | 24.3 |
| Emulsifier Mixture (sorbitan monostearate and polyoxyethylene sorbitan Monostearate) | 0.2 |
| Corn syrup solids | 30.4 |
| Starch derivative (dextrinized waxy maize acid-ester of a substituted succinic acid, derived from octenyl succinic acid anhydride) | 10.1 |
| Water | 35.0 |

The emulsifier mixture was stirred into the fat at 160° F. The starch derivative and corn syrup solids were added to water at 170° F. The fat and water phases were then mixed and stirred at 160° F. for 10 minutes and homogenized at 2500/500 psi to form a stable oil-in-water emulsion having a solids content of 65%. The emulsion concentrate was then spray dried in a Bowen Spray Drier to provide a dried fat emulsion product having a pH of about 3.5 to 4.0 and a starch derivative to fat ratio of 0.4:1. Another dried emulsion concentrate was prepared according to the above procedure with the exception that the chemically modified starch derivative was not included in the formulation.

The whitening effectiveness of both the spray dried emulsion concentrates was then evaluated in the same manner as described in Example I, and the results set forth in Table 2.

Table 2

| Product Tested | % Reflectance | |
|---|---|---|
| | 2% aqueous solution | 2.3% solution in coffee |
| Dried emulsion concentrate containing chemically modified starch | 54.9 | 17.2 |
| Dried emulsion concentrate not containing chemically modified starch | 3.5 | 0 |
| COFFEE-MATE | 50 | 17 |

As shown by these test results, the whitening ability of the spray dried, protein-free product of this invention compared favorably with that of the commercial whitener, and showed no signs of emulsion instability upon addition to coffee, thereby establishing that the starch derivative is capable of stabilizing the protein-free emulsion through drying to provide a stable dried emulsion. However, coffee whitened with the protein-free, spray dried product of this example had a pH of 4.3 and was somewhat bitter in taste due to the acidity of the product. The dried emulsion concentrate which did not contain chemically modified starch did not form a stable emulsion upon reconstitution, as evidenced by the low reflectance values.

Similar results are obtained when other chemically modified dextrinized starches having a lipophilic character are used, such as, for example, dextrinized starch esterified with a long chain fatty acid, dextrinized waxy maize starch chemically modified (i.e. esterified) with octenyl succinic anhydride produced by Anheuser-Busch, Inc. under the trademark SECAP 7400 and by American Maize Company under the trademark AMIOGUM, starch derivatives in which decenyl succinic acid anhydride, nonenyl succinic acid anhydride and heptyl glutaric acid anhydride are used as the substituted dicarboxylic acid, and starch derivatives in which waxy sorghum, sago, tapioca, corn, potato, rice and wheat are used as the starch. Also, it was found that the type or fat or oil used in the formulation, does not greatly affect the whitening ability of the dried emulsion product in coffee.

EXAMPLE III

In order to improve the taste of the dried protein-free emulsion product of this invention in coffee so that the product may be used as a coffee whitener, buffering salts were dry blended with the dried emulsion concentrate prepared according to the procedure of Example II. Thus, varying ratios of $K_2HPO_4$ and $KH_2PO_4$ were admixed to give buffer salt mixtures having pH's of 6.0, 6.5, 7.0, 7.5 and 8.0. Each of these buffer salt mixtures was then dry blended with a spray dried fat emulsion product produced according to the formulation and procedure of Example II, to give a product containing 2.2% of the buffer salt mixture. The pH and reflectance of the products as a 20% aqueous solution and at 2.3% solids in a 1% solution of freeze-dried coffee were then determined. The taste of the whitened coffee was rated on a scale of 1 to 4, with 1 being the most preferred and 4 being the least preferred. The results of these tests are set out in Table 3.

Table 3

| pH of buffer mixture | 20% Aqueous Solution | | 2.3% in Coffee | | Taste Ranking |
|---|---|---|---|---|---|
| | % Reflectance | pH | % Reflectance | pH | |
| 6.0 | 82.5 | 4.2 | 17.5 | 4.6 | (3) |
| 6.5 | 82.5 | 6.1 | 17.5 | 4.7 | (3) |
| 7.0 | 78.6 | 6.7 | 17.5 | 4.7 | (1) |
| 7.5 | 76.2 | 7.0 | 16 | 5.0 | (2) |
| 8.0 | 76.2 | 7.3 | 15.5 | 5.1 | (4) |
| COFFEE-MATE | — | — | 17 | 4.9 | |

Thus, the addition of the buffering agent to the dried emulsion product does not impair the stability or the whitening ability of the dried emulsion product and improves the taste of the dried emulsion product in coffee.

EXAMPLE IV

As discussed hereinabove, the pH of the liquid emulsion concentrate containing fat, emulsifier and chemically modified starch must be controlled in order for the chemically modified starch to effectively stabilize the emulsion concentrate through the drying step. In order to demonstrate the effect of pH on the ability of the starch derivative to stabilize the emulsion concentrate through drying, liquid emulsion concentrates were prepared according to the procedure of Example I containing the following ingredients:

| Ingredient | Percent by Weight |
|---|---|
| Cottonseed Oil | 24.3 |
| Emulsifier Mixture (sorbitan monostearate and polyoxyethylene sorbitan monostearate) | 0.2 |
| Corn syrup solids | 12.1 |
| Starch derivative (dextrinized waxy maize acid-ester of octenyl succinic acid anhydride) | 28.3 |
| Water | 35.1 |

Three batches having this formulation were prepared according to the same procedure, with the exception that one batch (A) was neutralized with sodium hydroxide to a pH of 7 prior to drying; one batch (B) was neutralized with di-potassium phosphate prior to drying; and the third batch (C) was not neutralized, the pH of this batch remaining at 3.0. After freeze drying, reflectance measurements were obtained at 550 mn on the three batches, both as a 2% aqueous solution and at 2.3% whitener solids in a 1% solution of freeze-dried coffee. The results are set out in Table 4.

Table 4

| Batch Tested | % Reflectance | |
|---|---|---|
| | 2% aqueous solution | 2.3% in coffee |
| A | 8.0 | 3.0 |
| B | 11.0 | 3.3 |
| C | 46.5 | 15.2 |

This clearly shows that the ability of the starch derivative to stabilize the emulsion through the drying step is affected by the pH of the liquid emulsion concentrate.

Subsequent tests established that emulsion stability, as evaluated by reflectance measurements, decreases drastically when the pH of the liquid emulsion concentrate is above 4.0.

EXAMPLE V

Liquid emulsion concentrates having the following formulations were prepared according to the procedure of Example I.

| Ingredient | Amount (gms) | |
|---|---|---|
| | A | B |
| Soybean Oil | 30 | 30 |
| Corn syrup solids | — | 12.5 |
| Starch derivative (dextrinized waxy maize acid ester of octenyl succinic acid anhydride) | 50 | 37.5 |
| Emulsifier | 0.33 | 0.33 |
| Water | 43.3 | 43.3 |

Reflectance measurements were obtained on the resulting dried products as a 2% aqueous solution, with the following results:

| Product Tested | % Reflectance (550 nm) |
|---|---|
| Sample A | 53.2 |
| Sample B | 51 |
| COFFEE-MATE | 50 |

While the dried emulsion product of the present invention has been described as suitable for use as a coffee whitener, it is to be understood that it is also suitable for use in a variety of other dried, protein-free, non-dairy fat emulsion products which are intended to be reconstituted by the consumer prior to use. For example, the product of this invention may be used in preparing dried imitation sour cream mix, dried chip dip mix, dried creamy salad dressing mix, and the like. In such products, where an acidic taste is not objectionable, buffering salts need not be dry blended with the dried emulsion concentrate.

Although the present invention has been described with reference to specific examples, it will be understood that changes, modifications, variations of composition and procedure may be made by those skilled in the art within the principle and scope of the appended claims.

We claim:

1. A dry, protein-free coffee whitener which comprises
    a dried emulsion concentrate containing
        from 0%-55% by weight of a water soluble carbohydrate,
        from 0.2%-1.25% of an emulsifier, and
        from 20%-50% by weight of an edible fat having an average particle size of about 1-3 microns in diameter, said fat being stabilized with a chemically modified dextrinized starch derivative having a lipophilic character in an amount sufficient to provide the product with a starch derivative to fat ratio of between about 0.4-1.25 to 1, and
    a buffering salt in an amount sufficient to provide the product with a pH in the range of 6-7 when reconstituted.

2. The coffee whitener defined in claim 1 in which the chemically modified starch is a dextrinized starch acid-ester of a substituted cyclic dicarboxylic acid anhydride.

3. The coffee whitener defined in claim 1 in which the whitener contains from 1% to 3% by weight of a buffering agent selected from the group consisting of phosphate and citrate salts and mixtures thereof which have a pH of from about 6-8.

4. The coffee whitener defined in claim 1 in which the whitener comprises a dried emulsion concentrate containing
    from 20%-35% by weight of an edible fat having a melting point of about 110° F.-115° F.,
    no more than about 1.25% by weight of an emulsifier, and
    from 10%-35% by weight of a carbohydrate,
    said fat being stabilized with a dextrinized waxy maize acid-ester of a substituted succinic acid derived from octenyl succinic acid anhydride in an amount sufficient to provide a ratio of starch derivative to fat of 0.6-0.8 to 1, and
    a buffering salt comprising from 2.0-2.5% by weight of a mixture of mono- and dipotassium phosphate salts having a pH of 6-8.

5. The coffee whitener defined in claim 1 in which the chemically modified starch derivative has a pH of about 2.5-3.0.

6. The coffee whitener defined in claim 1 in which the buffering salt is selected from the group consisting of phosphate and citrate salts.

7. The coffee whitener defined in claim 1 in which the chemically modified starch is a dextrinized waxy maize acid-ester of a substituted succinic acid derived from octenyl succinic acid anhydride.

8. The coffee whitener defined in claim 1 in which the dried emulsion concentrate has a pH of no more than about 4.0.

9. The coffee whitener defined in claim 8 in which the dried emulsion concentrate has a pH of from 3.5-4.0.

10. A method of preparing a stable, dry, protein-free coffee whitener which comprises
    forming a liquid emulsion concentrate containing an edible fat having an average particle size of about 1-3 microns in diameter, an emulsifier, water and a chemically modified dextrinized starch having a lipophilic character, the emulsion concentrate containing sufficient fat to provide said concentrate, when dried, with a fat content of from 20%-50% by weight, and having a pH of no more than about 4.0 and a starch derivative to fat ratio of between about 0.4-1.25 to 1
    drying the liquid emulsion concentrate, and
    admixing the dried emulsion concentrate with at least one buffering salt to provide the whitener with a pH of about 6-7, when reconstituted.

11. The method defined in claim 10 in which a fat phase containing fat and emulsifier and having a temperature of about 130° F.-140° F., and an aqueous phase containing the chemically modified starch derivative and having a temperature of about 150°-200° F. are combined and homogenized to provide a stable emulsion concentrate having a pH of no more than 4.0 in which the fat particles have an average diameter of about 1-3 microns, and the liquid emulsion concentrate is spray dried.

12. The method defined in claim 10 in which the dried emulsion concentrate is dry blended with from 2.0%-2.5% by weight of a mixture of mono- and dipotassium phosphate salts having a pH of 6-8.

13. The method defined in claim 10 in which the chemically modified starch is a dextrinized starch acid-ester of a substituted cyclic dicarboxylic acid anhydride.

14. The method defined in claim 13 in which the chemically modified starch is a dextrinized waxy maize acid-ester of a substituted succinic acid derived from octenyl succinic anhydride and is present in an amount sufficient to provide the liquid emulsion concentrate with a starch derivative to fat ratio of 0.6–0.8 to 1.

15. The method defined in claim 10 in which the liquid emulsion concentrate contains a water soluble carbohydrate in an amount sufficient to provide the concentrate, when dried, with a carbohydrate content of from 10%–35% by weight.

16. The method defined in claim 10 in which the dried emulsion concentrate is dry blended with from 1%–3% by weight of a buffering salt selected from the group consisting of phosphate and citrate salts.

17. The method defined in claim 10 in which the dried emulsion concentrate has a pH of between about 3.5–4.0 prior to admixing with the buffering salt.

18. The method defined in claim 10 in which the liquid emulsion concentrate is spray dried.

* * * * *